Aug. 24, 1926.
J. W. GIBBONS
1,597,033
SPRAYING APPARATUS
Filed April 17, 1925
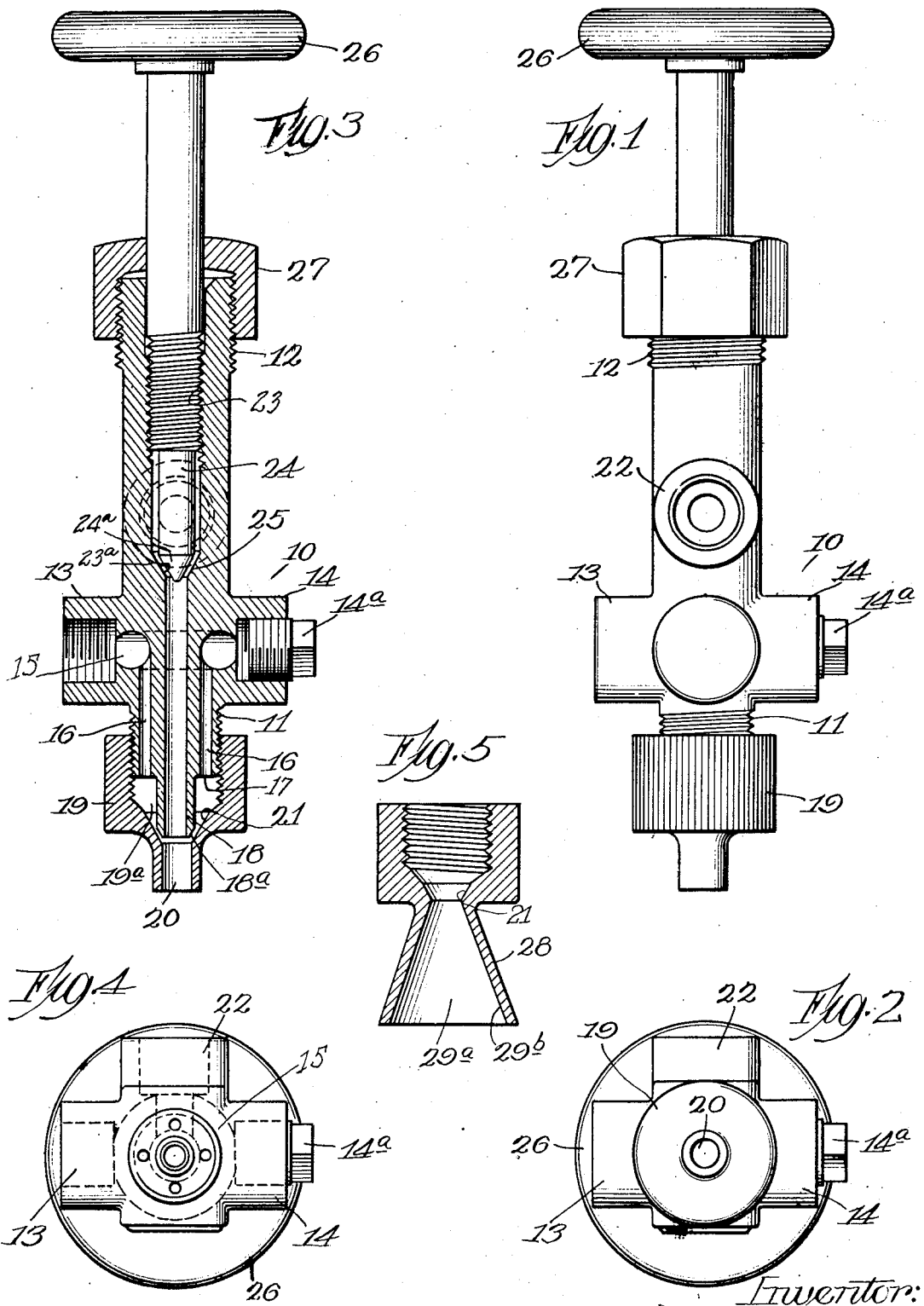
Inventor:
James W. Gibbons
By George Bayard Jones
Atty.

Patented Aug. 24, 1926.

1,597,033

UNITED STATES PATENT OFFICE.

JAMES W. GIBBONS, OF TOPEKA, KANSAS.

SPRAYING APPARATUS.

Application filed April 17, 1925. Serial No. 23,787.

This invention relates to improvements in spraying apparatus.

One object of the invention is to provide a spraying device or air brush which is efficient in operation, simple in construction and having readily adjustable means whereby the flow of paint, varnish or other material may be positively and accurately controlled.

Other objects and advantages will be apparent from a consideration of the following specification and accompanying drawings, wherein Fig. 1 is a side view of my invention.
Fig. 2 is an end view thereof.
Fig. 3 is a longitudinal sectional view.
Fig. 4 is an end view with the nozzle removed, and
Fig. 5 is a quarter sectional view of a modified form of nozzle.

In the drawings, 10 is the barrel or body of the apparatus, exteriorly threaded at the forward and rear ends 11 and 12, respectively. Intermediate the ends the body 10 is provided with a pair of integral oppositely disposed extensions or bosses 13 and 14, each of which is centrally bored and threaded, as shown in Fig. 3. The bore of extension 13 constitutes the intake of the body for paint, varnish or other liquid with which the device is used. The bore of extension 14 is normally closed by screw plug 14ª which may be removed, when desired, for cleaning purposes.

The bores of the extensions 13 and 14 communicate with distributing chamber 15 from which extend the ducts 16 which terminate at the shoulder 17 formed by reducing the end 11 of the barrel to form the projection 18. The ducts 16 are shown as being four in number, but more or fewer thereof may be provided, if desired. The forward end of projection 18 is beveled or chamfered, as shown at 18ª. A nozzle 19 is internally chambered at 19ª and is threaded for screwing on the end 11 of the barrel 10. The forward end of the nozzle 19 is reduced in diameter, as shown, and has the opening 20 therein through which the liquid is discharged. The opening 20, at its rear, has a conical wall 21 which co- operates with the chamfered end 18ª of extension 18 to form a valve for the regulation of the flow of liquid into the discharge opening. By turning the nozzle 19 relatively to the barrel 10 the flow of liquid can be increased or restricted to any desired extent, as will be clear. The nozzle is preferably knurled, as shown in Fig. 1.

The paint, varnish or other liquid is drawn through the device, as above described, by means of air from a source of supply under pressure. The air enters the barrel 10 through the intake bore in the extension or boss 22 which is threaded for connection with a flexible supply conduit, not shown. The air passes into the longitudinal air duct 23 extending the length of the barrel 10, as shown in Fig. 3. The duct 23 is enlarged throughout a portion of its length and receives the threaded valve stem 24 which closes the rear of duct 23 and terminates in a tapered end 24ª adapted to coact with the conical wall 23ª of the duct 23 to form a needle valve for regulating the flow of air through said duct, said valve being indicated, generally, by numeral 25. The stem 24 has an operating handle 26 by means of which the valve may be regulated. An apertured, threaded nut 27 closes the upper end of the barrel 10.

It will be seen that when the valve 25 is open air under pressure from the source of supply (not shown) will pass into duct 23 and through outlet opening 20 in nozzle 19. The rapidly flowing air will produce a siphonic effect upon chamber 19ª whereby the liquid, such as paint or the like is caused to flow from the source of supply through the ducts 16 into chamber 19ª, through the restricted opening between the wall 21 and chamfered end 18ª of projection 18. The action of the air in drawing the fluid through the ducts and openings of the device thoroughly atomizes the same and carries it through the outlet 20 of the nozzle 19 in the form of a fine spray. The atomizing effect and flow of liquid can be controlled or regulated by the adjustment of the air by means of valve 25 and by regulating the flow of liquid by means of the adjustable nozzle 19, as will be clear. It will be understood that the paint or other liquid may also be delivered to the apparatus by means of pressure or gravity, if desired.

In Fig. 5, I have shown a modified form of nozzle which may be substituted for the nozzle 19 when desired. The nozzle 28 of Fig. 5 differs from nozzle 19 in that the outlet 29$^a$ of the former is formed with a flaring or conical internal wall 29$^b$, as shown. Nozzles of other shapes may be provided for special uses which will be readily interchangeable with those above described.

Although I have shown and described certain features of my invention for purposes of illustration, it will be understood that various changes may be made therein without departing from the spirit of the invention, for instance, the trigger valve, such as that shown in my Patent No. 1,504,443 of August 12, 1924, may be substituted for the valve stem 24, and handle 26, shown and described herein.

What I claim as new is:

1. A device of the class described comprising a body member having a longitudinal air duct therein, a valve for controlling the flow of air therethrough, from a source of supply under pressure, a liquid supply duct formed in said body terminating adjacent the forward end of said member, and a nozzle enclosing the forward ends of said air and liquid duct, said duct being so disposed with reference to said liquid supply duct that air passing through said air duct produces a siphonic effect on the liquid in said liquid supply duct.

2. A device of the class described comprising a body member having a longitudinal air duct therein, a valve for controlling the flow of air therethrough, said body member having a reduced forward portion forming a shoulder, said air duct extending through said portion, a liquid supply duct formed in said body terminating at said shoulder, and an adjustable nozzle member enclosing the outlet ends of both of said ducts for regulating the flow of liquid through said nozzle.

3. A device of the class described comprising a body, an air duct therein, a valve for controlling the flow of air therethrough from a source of supply under pressure, a liquid supply duct formed in said body terminating short of the forward end thereof, and a nozzle member enclosing the outlet ends of both said ducts and being adapted to control the flow of liquid through said liquid duct.

4. A device of the class described comprising a body portion, an air duct therein, a valve for regulating the flow of air through said duct, a liquid duct in said body terminating adjacent the forward end thereof, and a nozzle adapted to enclose the outlet ends of both said ducts and having an inclined wall adapted to coact with a portion of said body to control the flow of liquid through said nozzle.

5. A device of the class described comprising a body member, an air duct therein having its outlet at the forward end of said member, a valve for regulating the flow of air through said duct, a liquid supply duct in said member terminating adjacent the outlet of said air duct, and a nozzle enclosing the outlets of both said ducts and having a chamber through which liquid from said liquid duct is drawn by air flowing from the outlet of said air duct.

6. A device of the class described comprising a body member, an air duct therein having its outlet at the forward end of said member, a valve for regulating the flow of air through said duct, a liquid supply duct formed in said member terminating adjacent the outlet of said air duct, and a nozzle enclosing the outlets of both said ducts and having a chamber through which liquid from said liquid duct is drawn by air flowing from the outlet of said air duct, said nozzle being adjustable to vary the flow of liquid therethrough.

7. A device of the class described comprising a body member, an air duct therein having its outlet at the forward end of said member, a liquid intake, a liquid distributing chamber in said body member in communication with said intake, liquid ducts extending forwardly from said chamber and terminating adjacent the forward end of said body, and an adjustable nozzle member enclosing the outlets of said air and liquid ducts and having a chamber through which liquid is drawn by air flowing from the outlet of said air duct.

8. A device of the class described comprising a body member, an air duct therein having its outlet at the forward end of said member, a liquid intake, a liquid distributing chamber in said body member in communication with said intake, liquid ducts extending forwardly from said chamber and terminating adjacent the forward end of said body, and an adjustable nozzle member enclosing the outlets of said air and liquid ducts and having a chamber through which liquid is drawn by air flowing from the outlet of said air duct, said nozzle being adjustable to vary the flow of liquid therethrough.

9. A device of the class described comprising a body member having an air duct and liquid ducts formed therein, a valve controlling the flow of air through said duct, and a nozzle enclosing the discharge ends of both said ducts, said nozzle being adjustable for controlling the flow of liquid through said liquid duct.

10. A device of the class described comprising a body member having a liquid distributing chamber therein, a liquid intake opening communicating with said chamber, liquid ducts formed in said member extending forwardly from said chamber and terminating short of the forward end of said body member, said body being provided with an aperture providing access for cleaning said chamber and ducts, and a closing member for said aperture.

In testimony whereof, I have subscribed my name.

JAMES W. GIBBONS.